April 28, 1959 H. K. BAKER 2,883,881
VARIABLE SPEED TRANSMISSION
Filed Aug. 1, 1956 2 Sheets-Sheet 2
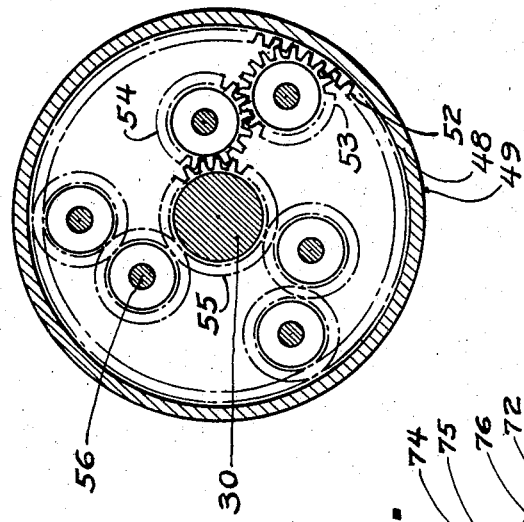
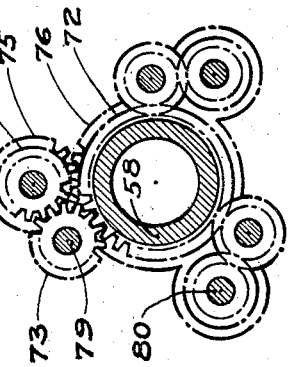
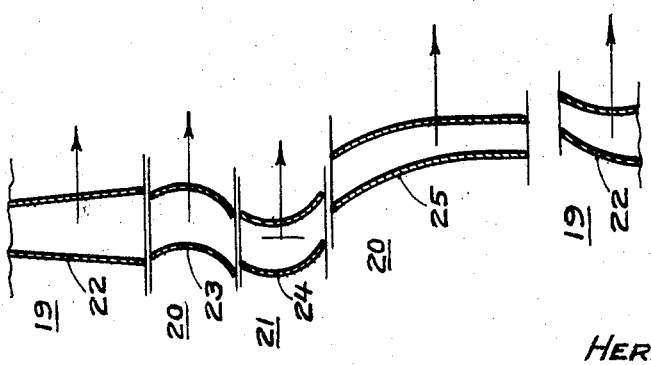
INVENTOR.
HERBERT K. BAKER
BY
Smith, Olsen, Lewis & McRae

United States Patent Office 2,883,881
Patented Apr. 28, 1959

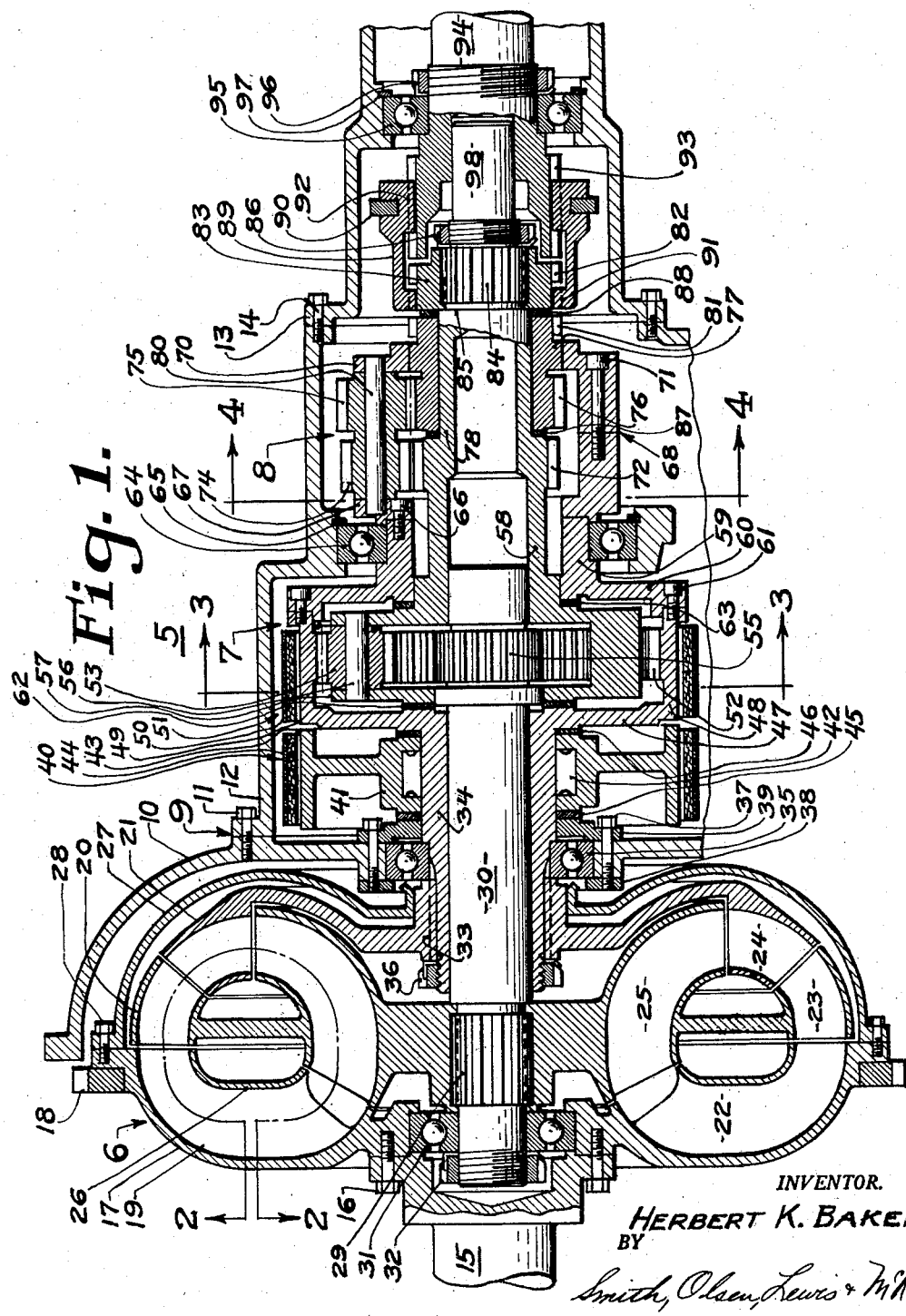

2,883,881

VARIABLE SPEED TRANSMISSION

Herbert K. Baker, Detroit, Mich.

Application August 1, 1956, Serial No. 601,582

18 Claims. (Cl. 74—677)

This invention relates to variable speed transmissions and of particular concern respecting improvements to hydraulic torque converter transmissions of the kind disclosed in my copending application Serial No. 190,471 filed October 17, 1950 from which Patent Number 2,762,-238 was issued on September 11, 1956 and is a continuation-in-part of this application, and application, Serial Number 70,163 filed January 11, 1949 (now abandoned).

In common with the form of transmission disclosed by Figures 1 to 7 inclusive of my copending application referred to, the present invention discloses a hydraulic torque converter comprising vaned rotor members in arrangement wherein, the normal turbine and reaction rotors are utilized respectively as primary and secondary runners which are coupled separately to different elements of the planetary gearing system so arranged to impose, during a phase of variable speed forward drive operation, a division of the torque in major and minor proportions upon the respective primary and secondary runners with the latter runner rotatably mounted responsive to the action of the motive fluid in the extent of being prevented from relative reverse rotation by a unidirectional brake which, however, freely permits forward rotation in a like direction to that of the primary runner and the impeller, and further including, additional braking means made selective for restraint of directional gearing reaction exertion of forward driving influence, during reverse drive operation of the transmission, two elements of the planetary gearing system arranged for driving in opposite directions together with clutching means to clutch either of said driven elements to the transmission output shaft.

An important object of the present invention is to provide improved operating characteristics of transmissions of the character described by the unique gearing arrangement for the balancing of directional reaction forces in coordination, or nearly so, with changing values of planetary gearing reactions through one speed phase category and into another as encountered during variable speed forward drive operation.

Another important object is to provide in a transmission of the character described a gearing system, so arranged, that at the moment of fluid reaction lift-off no gearing reaction load of any import is imposed upon the secondary runner for, in consequence, the provision of maximum sensitivity of responsiveness for this runner to the changeover action of the motive fluid from the commonly called "vortex" to "rotary" flow influence.

Another important object is to provide in a transmission of the character described an arrangement whereby, during the variable speed phase of forward drive operation, at a point beyond fluid changeover to "rotary" flow influence whence fluid impingement upon the vanes of the secondary runner has attained an appreciable velocity force, thereupon, coactingly the changing gearing directional reaction values resulting from the passing out of a speed phase category by a first planetary gear set are coordinately readjusted by a second planetary gear set which then imposes only a small fractional portion of the torque upon the secondary runner from thereon through to unison operation of the rotating hydraulic and gearing elements of the transmission.

Another object is to provide in a transmission of the character described an arrangement of the hydraulic torque converter rotors to coactingly coordinate efficiently with the gearing system for enhancing torque multiplication by the provision of the secondary runner having a single series vane element interposed between the series of a two series vane element of the primary runner together with vane forming and proportioning to maintain effective fluid velocity for impingement in what may be termed a two stage action upon this primary runner and, by virtue of this action, the change in direction of flow as the fluid passes from one set of vanes to the next is made smaller.

The general object of this invention being to provide in a transmission of the foregoing character an improved mechanism comprising a hydraulic torque converter in arrangement to coact with two planetary gear sets whereby the changing directional reaction force values, like before referred to, are compensatingly coordinated to improve the responsive action of the secondary runner in its dual role as a reaction member and a runner, including the further provision of a larger rate of torque multiplication without penalizing the efficiency of the hydraulic system thereof.

To those skilled in the art the foregoing objects together with many other features disclosed herein will be apparent from the following description and the accompanying drawings in which:

Figure 1 is a central vertical section taken lengthwise of the transmission.

Figure 2 is a section taken at 2—2 of Figure 1 disclosing vane tontours of the various hydraulic rotors.

Figure 3 is a cross section taken at 3—3 of Figure 1 with the brake band removed and disclosing the forward planetary gear set comprising a ring gear, double pinions and a sun gear.

Figure 4 is a cross section taken at 4—4 of Figure 1 disclosing the rearward planetary gear set comprising two sun gears drivingly connected through by three elements of pinion gears.

Referring to the drawings in detail Figures 1 to 4 inclusive show a variable speed transmission generally designated 5 (Figure 1) comprising a hydraulic torque converter 6 combining with a forward planetary gear set 7 which in turn coacts with a rearward planetary gear set 8. All of these mechanisms are enclosed in a housing 9 which consists of a bell shaped housing 10 bolted as at 11 to the forward end of a gearing housing 12 which at its rearward end is a transmission shaft housing 13 bolted thereto as at 14.

Drivingly connected to the hydraulic torque converter 6 is a power input shaft 15 bolted as at 16 to the forward hydraulic torque converter casing half 17 and adjacent the periphery thereof and drivingly secured thereto is ring gear 18 for engagement by a pinion (not shown) of a conventional starting motor (not shown).

Combined with the hydraulic torque converter forward casing half 17 is an impeller rotor 19 and adjacent thereto is a primary runner 20 while operatingly positioned therewith is a secondary runner 21. Vanes of the impeller rotor 19 are designated 22 and the primary runner 20 having two series of vane elements, the vanes of the first series are designated 23 and the second series vanes 25. The single series vanes 24 of the secondary runner 21 are interposed between the two series of vane elements 23 and 25. A split annular guide ring is indicated as 26 and the rearward casing half 27 bolted at 28 completes the enclosure of the hydraulic torque converter rotors. Direction of rotation of these rotors is indicated by the arrows shown in Figure 2, however, the arrow with the crossline at vanes 24 of the secondary runner 21 indicate braking and direction of rotation.

It will be noted that the fluid pathway provided as shown in Figure 1 by the annular split guide ring at 26 together with the outer walls of the hydraulic torque converter rotors assumes a shape similar to a modified letter D with the vertical leg thereof being at the impeller rotor and the depth of the fluid pathway at the latter mentioned rotor is generally deeper except as to near and at the discharging end thereof being narrowed to like depth to the adjacent lead-in ends of the primary runner vanes 23 for the purpose of relatively increasing the rate of fluid velocity in maintenance of effective force upon the second series vanes 25 of this runner during heavy "vortex" flow influence.

In Figure 2, vane contours of the hydraulic rotors are shown in arrangement wherein the first series of vanes 23 of the primary runner 20 presents a concave impingement surface and for reversing fluid component to opposite facing concave surfaces of vanes 24 of the secondary runner 21 which provide for again reversing the component of the fluid to impinge upon concave surfaces of the primary runner vanes 25, however, these vanes 25 terminate toward their discharging ends somewhat at right angles to the direction of their rotation and that relatively much greater gap separates the discharging ends of these primary runner vanes 25 and the curved lead-in portions of the impeller vanes 22 than the gaps between the other vane ends.

The primary runner 20 is drivingly mounted on the splined portion 29 of shaft 30 which is supported at its forward end by ball bearing 31 held to axial position by locknut 32. The secondary runner 21 is drivingly mounted with its hub on the splined portion 33 of the sleeve-like shaft 34 which is arranged rotatably encircling shaft 30 and supported by ball bearing 35 while the outer race thereof is secured to axial position by bolting as at 37 the retainer 38 and the combination retainer and thrust ring 39 to the bell shaped housing 10.

Rotatably mounted on the sleeve like shaft 34 is a unidirectional brake unit 40 having a hub 41 formed to contain sprag type unidirectional brake elements 42 and extending integral from this hub is a web supporting a circular rim which at its periphery is formed a braking surface 43 for application thereon by brake band 44 while thrust washers 45 and 46 hold said braking unit to axial position.

A web is formed integral with sleeve like shaft 34 together with a circular rim 48 (Figure 1) having at its periphery braking surface 49 for applied action thereon of brake band 50 which together with the elements associated therewith comprise a brake unit generally designated 51 for halting ring gear 52 formed at the interior of the rim 48.

Meshing with the ring gear 52 are planet pinions 53 (Figures 1 and 3) which also mesh with pinions 54 (Figure 3) in turn meshing with sun gear 55 formed integral with shaft 30 for coaction therewith. Pinions 53 and 54 are rotatably mounted on shafts 56 (Figures 1 and 3) supported by planet pinion carrier 57 (Figure 1) which is formed integral with hollow shaft 58 rotatably mounted in the bore of hub 59 formed integral with a flanged web 60 bolted at 61 to the rim 48 for coaction with the ring gear 52 and this ring gear together with pinions 53, 54 including sun gear 55 and planet pinion carrier 57 comprise the forward planetary gear set before designated 7. Thrust washers 62 and 63 hold the planet pinion carrier 57 to axial position.

The outer race of ball bearing 64 is mounted in gearing housing 12 and secured to position by snap ring 65 and the inner race of this bearing is mounted on hub 59 and secured to position by bolting at 66 the forward portion 67 of planet pinion carrier 68 including rearward portion 70 bolted thereto as at 71 for coaction of hub 59 and planet pinion carrier 68.

Formed integral with the hollow shaft 58 is sun gear 72 (Figures 1 and 4) meshing with pinion 73 (Figure 4) which also meshes with pinion element 74 (Figures 1 and 4) formed integral in axial alignment with pinion element 75 in turn is meshed to sun gear 76 having hollow drive extension 77 which together are rotatably mounted on reduced portion 78 of hollow shaft 58. On shaft 79 pinion 73 (Figure 4) is rotatably mounted while pinion element 74 integral with pinion element 75 is rotatably mounted on shaft 80 (Figures 1 and 4) in arrangement of both these shafts supported by planet pinion carrier 68 which together with pinions 73, 74, 75 including sun gears 72 and 76 comprises the rearward planetary gear set previously designated 8.

External clutch teeth 81 are formed on sun gear drive extension 77 for forward drive operation and similar clutch teeth 82 are formed on clutch drive ring 83 for reverse drive operation. This clutch drive ring is mounted drivingly splined at 84 to the reduced portion 78 of hollow shaft 58 and drawn to position against shoulder at 85 by locknut 86. Thrust washers 87 and 88 hold sun gear 76 to axial position.

At this point it will be observed from the foregoing description that, the primary runner 20 and the sun gear 55 of the forward planetary gear set 7 are coupled for coaction together, the secondary runner 21 with the ring gear 52 of the forward planetary gear set 7 and the planet pinion carrier 68 of the rearward planetary gear set 8 are coupled together, the planet pinion carrier 57 of the forward planetary gear set 7 and the sun gear 72 of the rearward planetary gear set 8 along with the clutch drive ring 83 are coupled together. The sun gear 76 with integral formed clutch teeth 81 is mounted for resultant output action thereon by the coordinated differential operation of both the forward and rearward planetary gear sets 7 and 8 respectively for forward drive operation.

A clutch shifter sleeve 89 grooved to receive a shifter fork 90 has at its forward end internally formed clutch teeth 91 for selectively registering with the correspondingly formed external clutch teeth 81 of the sun gear drive extension 77 and clutch teeth 82 of the clutch drive ring 83. This clutch shifter sleeve is internally splined as at 92 for sliding and driving operation on corresponding externally splined portion 93 of the transmission output shaft 94 which is mounted through the inner race of ball bearing 95 and secured to position axially by locknut 96 while the outer race of ball bearing 95 is mounted in the transmission shaft housing 13 and held to position by snap ring 97. Extending from the reduced portion 78 of the hollow shaft 58 is shaft rearward extension 98 which is rotatably mounted and supported in the bore of transmission output shaft 94.

*Operation of the variable speed transmission*

In operation of the transmission shown in Figures 1 to 4 inclusive, illustrating the present invention, let it be assumed, that the power input shaft 15 is coupled to an internal combustion engine of an automotive vehicle and that motive fluid is provided for operation of the hydraulic torque converter 6, the engine is idling and the clutch shifter sleeve 89 is selectively positioned by shifter fork 90 so that the internally formed clutch teeth 91 of said sleeve are disengaged and between clutch teeth 81 of the sun gear drive extension 77 and the clutch teeth 82 of the clutch drive ring 83 while the brakes 40 and 51 are in released position, thus, controls are conditioned so that no power is transmitted to the transmission output shaft 94 or operatingly in what is commonly termed "neutral."

Forward drive is attained from the just mentioned conditioning of neutral, while the engine is idling and the impeller rotating therewith and correspondingly exerting only a very limited force on the motive fluid, by the shifter fork 90 selectively shifting the shifter sleeve 89 to engagement of clutch teeth 91 thereof with clutch teeth 81 of the drive extension 77 of sun gear 72. At this stage of operation, the output sun gear 76 being stalled with the transmission output shaft 94 due to the load impressed thereon in starting up a vehicle, such limited fluid force action referred to is largely dissipated, at this stage, by the primary runner 20 rotating the sun gear 55 relatively clockwise causing a driving action upon pinions 53 and 54 in turn upon ring gear 52 thence reacting reversely upon planet pinion carrier 57 and therewith sun gear 72 which in turn drives pinion elements 73, 74 and 75 reacting against the stalled sun gear 76 causing the planet pinion carrier 68 to rotate relatively counterclockwise together with ring gear 52 (brakes 40 and 51 released) and the secondary runner 21 in a free-to-seek differential gearing ratio action of one cancelling out the other so as to nullify, or nearly so, the very limited driving force upon the rotors of the hydraulic torque converter 6, however, sufficient force is present for tooth hunting to engage the clutch teeth while the brakes 40 and 51 remain released.

Following the engaging of clutch teeth 91 with clutch teeth 81, thence the brake band 44 being applied the unidirectional brake unit 40 is made operative to prevent the secondary runner 21 with the ring gear 52 and the planet pinion carrier 68 coupled together from opposite rotation to that of the primary runner 20 and the impeller 19, thereby, establishing a maximum differential reaction ratio point for the gearing system, however, the unidirectional brake unit 40 freely permits the secondary runner with the gearing elements coupled thereto to rotate in the same direction as the primary runner and the impeller.

In the initial stage of maximum torque multiplication, or nearly so, whereby fluid action is by "vortex" flow influence, the motive fluid passes from the impeller 19 with a large component of its velocity in the direction of impeller-vane motion and impinges upon the first series vanes 23 of the primary runner 20 giving up some of its kinetic energy thereat while deflecting the motive fluid from its course with a component now in the opposite direction impinging upon the secondary runner vanes 24 where the direction of the motive fluid is then reversed with a component again in the direction of impeller-vane motion impinging upon the second series vanes 25 of the primary runner 20 and discharging therefrom into the relatively large gap between vane ends adjacent thereto for pick up and recirculation by the vanes 22 of the impeller rotor 19.

In the stage of action just before described, it will be noted that the secondary runner 21 is held stationary against the unidirectional braking elements 42 by considerable force along with the ring gear 52 and the planet pinion carrier 68, the primary runner 20 and the sun gear 55 are rotated relatively clockwise at substantially less speed than the impeller rotor 19 but with increased torque. Assuming that the sun gear 55 has thirty-six teeth and the ring gear 52 seventy-five teeth, the drive imparted to the sun gear 55 by the primary runner and passed to the two pinions 54 and 53 with the ring gear 52 held, results in, 1.00 counterclockwise revolution of the planet pinion carrier 57 and sun gear 72 coupled together, to, 2.08 clockwise revolutions of the primary runner 20 and the sun gear 55 coupled together.

The planetary gear sets 7 and 8 operate conjunctively by the coupling of, ring gear 52 with planet pinion carrier 68 and, planet pinion carrier 57 with sun gear 72. Assuming that, the sun gear 72 has thirty-three teeth meshing with pinion 73 having fifteen teeth in turn meshed with pinion element 74 having fifteen teeth which is formed integral with pinion element 75 having fifteen teeth drivingly meshed to the output sun gear having thirty-three teeth. With this proportioning the pinion element 75 and sun gear 76 have heavier tooth pitch for relatively greater center distances to provide clearance for pinion element 74. In the stage of the sun gear 72 rotating at 1.00 counterclockwise revolution to 2.08 clockwise revolutions of the primary runner 20 while the planet pinion carrier 68 is held, results in, 1.00 clockwise revolution of the sun gear 76 clutched to the output shaft 94, to, 2.08 clockwise revolutions of the privary runner 20 and sun gear 55 coupled together.

The latter ratio sets forth the torque multiplication obtainable from the complete gearing system for forward drive operation by the gearing proportions mentioned as an example, however, it is to be understood that other gearing proportions may be utilized without departing from the scope of this invention. It is expected by virtue of the two stage impingement effect upon the primary runner that a torque multiplication of at least 2.6 to 1.0 is to be had from my hydraulic torque converter arrangement which is to be multiplied by the gearing ratio, resulting in, $2.60 \times 2.08 = 5.40$ as the total torque multiplication available from the transmission in forward drive operation.

While the secondary runner 21 is held stationary, by "vortex" flow impingement, along with the ring gear 52 and the planet pinion carrier 68, the clockwise rotating drive imparted by the primary runner 20 to the sun gear 55 in turn passing to the pinions 54 and 53 (Figures 1 and 3) causes planet pinion carrier 57 to rotate counterclockwise, at a ratio before indicated, and therewith sun gear 72, driving pinion 73, in turn pinion elements 74 and 75 of integral coupling which reverses the drive to rotating the sun gear 76 clockwise (at this phase category) of straight gearing ratio by the planetary gear set 8 while the planet pinion carrier 68 is automatically held stationary.

Continuing in the phase, just before described, a load imposed on the output sun gear 76 that tends to slow its clockwise rotation is transmitted to the sun gear 72 which reacts to decrease the speed of its counterclockwise rotation and therewith the planet pinion carrier 57, in so doing, the pinions 54 and 53 react to the clockwise drive of the sun gear 55 and tend to drive the ring gear 52 also clockwise in a corresponding reaction balance return to the sun gear 55 and the primary runner 20 coupled together.

Upon acceleration of the engine, more power is developed and exerted upon the primary runner 20 for progressively faster rotation thereof in a first variable speed phase of catching up with the impeller rotor 19 to a point of fluid reaction lift-off from the vanes 24 of the secondary runner 21. At this point the driving and reaction forces of the gearing system are in balance and the secondary runner entirely responsive to the changeover action of the fluid stream from "vortex" to "rotary" flow influence, thereupon, the secondary runner 21 and the ring gear 52 along with the planet pinion carrier 68 commences in a progressively increasing speed phase of clockwise rotation while the planet pinion carrier 57 and the sun gear 72 coupled together correspondingly diminish the speed of their counterclockwise rotation in what may be called a second phase category of variable speed drive operation.

At the moment of fulfillment of this second speed phase category, the differential speed relationship of the pertinent hydraulic and gearing elements are, .48 of a clockwise revolution for the secondary runner 21 along with the ring gear 52 and planet pinion carrier 68 coupled together, to, .00 revolution of the planet pinion carrier 57 and the sun gear 72 coupled together, to, .96 clockwise revolution of the sun gear 76 and the transmission output shaft 94 clutched together, to, 1.00 clockwise revolution of the primary runner 20 and the sun gear 55 coupled together.

Therefore, in proceeding from the second phase, the corresponding speed reactions between the secondary runner 21 and the output sun gear 76 are, 1.00—.96=.04, 1.00—.48=.52, .52÷.04=13 times greater being the reaction speed of the secondary runner 21 to that of the output sun gear 76, thus, providing considerable ratio of advantage so that only a small fraction of the torque is imposed upon the secondary runner in the final phase toward attaining 1.0 to 1.0 speed ratio through the transmission for forward drive operation.

The secondary runner vanes 24 being, of course, fashioned to sustain their portion of the torque imposed thereon at any time and by reason of the reaction forces being balanced so not to impose a load of import upon the secondary runner during the second phase and that this runner is responsive to the motive fluid in a clockwise direction at all times, actually, the phase of narrowing the differential ratios betwen the primary and secondary runners takes place before the exact culmination of the second phase, in consequence, a blending of action from one phase into another occurs.

In the foregoing description, one example of gear ratios only has been utilized, other ratios may be employed, for greater or lesser multiplicaiton of torque or proportioning thereof between the primary and secondary runners, even to the extent of imposing no portion of the gearing reaction load upon the secondary runner thruout the variable speed phase of forward drive operation.

Reverse drive operation of the transmission 5 is obtained by shifting from "neutral" the clutch shifter sleeve 89 for engagement of the clutch teeth 91 thereof with clutch teeth 82 of clutch drive ring 83 which is drivingly coupled with the counterclockwise rotated elements of the gearing system. At this stage of operation, the primary and secondary runners are in a free to seek clockwise differential ratio action that largely dissipates the limited fluid force developed while the engine idles and brakes 40 and 51 are released. By applying brake band 50 of brake 51, ring gear 52 along with the secondary runner 21 and planet pinion carrier 68 are held stationary while the planet pinion carrier 57 along with sun gear 72 and clutch drive ring 83 clutched to the transmission output shaft 94 are rotated counterclockwise at a fixed gear ratio providing the same maximum reduction ratio as for forward drive operation by the gear proportions previously set forth as an example, however, in this reverse drive operation a limited variable torque is provided by the primary runner acting as a turbine and the secondary runner acting as a reaction member held stationary.

Down hill braking of a vehicle while the transmission remains conditioned for normal forward drive operation is obtained by merely applying brake band 50 of brake 51, with the transmission shaft 94 temporarily acting as the driving member, a substantial step up of speed is imparted to the primary runner 20 while the secondary runner 21 is held stationary in an action as a hydraulic brake of considerable effort which may be eased off by accelerating the engine. Upon release of the brake band 50 normal forward drive operation is resumed.

Having all the advantages and similar characteristics of the transmission set forth in my copending application previously referred to herein, the present invention, however, contains other important and unique material for substantially improved operating performance of variable speed transmission.

My invention being thus described by the foregoing, I claim:

1. A variable speed transmission including, a power input member and an output member, a hydraulic torque converter having an impeller rotor coupled to the power input member, a primary runner and a secondary runner coupled to rotatingly coacting elements of a planetary gearing system, a casing member to enclose the impeller rotor and the runners for action on the motive fluid to impart driving torque, said coacting elements in arrangement of one having a greater ratio action than the other to divide the torque into unequal portions, the primary runner mounted to operatingly rotate always in one direction for imparting the major portion of the torque, the secondary runner mounted rotatably responsive to the action of the motive fluid for imparting the minor portion of torque in the same direction as the primary runner rotation, elements of the gearing system in arrangement for differential action to impose both portions of torque on the output member.

2. A variable speed transmission including, a power input member and an output member, a hydraulic torque converter having an impeller rotor coupled to the power input member, a primary runner and a secondary runner coupled to rotatingly coacting elements of a planetary gearing system, a casing member to enclose the impeller rotor and the runners for action on the motive fluid to impart driving torque, said coacting elements in arrangement of one having a greater ratio action than the other to divide the torque into unequal portions, the primary runner mounted to operatingly rotate always in one direction for imparting the major portion of the torque, unidirectional braking elements for restricting the secondary runner rotation to a single direction for action of this runner as a reaction member and as a secondary runner responsive to the action of the motive fluid for imparting the minor portion of the torque, elements of the gearing system in arrangement for differential action to impose both portions of the torque on the output shaft.

3. A variable speed transmission including, a power input member and an output member, a hydraulic torque converter having an impeller rotor coupled to the power input member, a primary runner and a secondary runner coupled to rotatingly coacting elements of a planetary gearing system, a casing member to enclose the impeller rotor and the runners for action on the motive fluid to impart driving torque, said gearing system of differential action character having a driven element rotating in the direction with the impeller and another driven element rotating reversely thereto, said coacting elements in arrangement of one having a greater ratio action than the other to divide the torque into unequal portions, the primary runner mounted to operatingly rotate always in one direction for imparting the major portion of the torque, unidirectional braking elements for restricting the secondary runner rotation to a single direction for action of this runner as a reaction member and as a secondary runner responsive to the action of the motive fluid to impart the minor portion of the torque, means to clutch the output member with either of said driven elements.

4. A variable speed transmission including, a power input member and an output member, a hydraulic torque converter having an impeller rotor coupled to the power input member, a primary runner and a secondary runner coupled to rotatingly coacting elements of a planetary gearing system, a casing member to enclose the impeller rotor and the runners for action on the motive fluid to impart driving torque, said gearing system of differential action character having a driven element rotating in the direction with the impeller and another driven element rotating reversely thereto, said coacting elements in arrangement of one having a greater ratio action than the other to divide the torque into unequal portions, the primary runner mounted to operatingly rotate always in one direction for imparting the major portion of the torque, unidirectional braking elements for restricting the secondary runner rotation to a single direction for action of this runner as a reaction member and as a secondary runner responsive to the action of the motive fluid to impart the minor portion of the torque, additional braking elements selectively engageable for restraining the secondary runner from rotation in any direction, means to clutch the output member with either of said driven elements.

5. A variable speed transmission comprising, a planetary gearing system of differential action character subject to both driving and reaction forces, a hydraulic torque converter having an impeller rotor coupled to a power input member, a primary runner and a secondary runner coupled to rotatingly coacting elements of the gearing system, an output element of the gearing system responsive to reaction force, a casing member to enclose the impeller rotor and the runners for action on the motive fluid to impart driving torque, said coacting elements in a ratio action arrangement between the runners, said arrangement for imposing the reaction force proportionately corresponding to the torque imparted by each of the runners, the primary runner mounted operatingly to impart the major portion of the driving torque, the secondary runner rotatably mounted to impart the minor torque portion in the direction of the primary runner rotation, unidirectional braking elements operative to restrict the secondary runner rotation to a single direction and additional braking elements operative to prevent rotation thereof in either direction, said gearing system in arrangement to impart both portions of torque to said output element.

6. A variable speed transmission comprising, a planetary gearing system of differential action character subject to both driving and reaction forces, a hydraulic torque converter having an impeller rotor coupled to a power input member, a primary runner and a secondary runner coupled to rotatingly coacting elements of the gearing system, an output element of the gearing system responsive to reaction force, a casing member to enclose the impeller rotor and the runners for action on the motive fluid to impart driving torque, said coacting elements in a ratio action arrangement between the runners, said arrangement to impose the reaction force proportionately corresponding to the torque imparted by each of the runners, driving elements in arrangement for rotation in opposite directions, the primary runner mounted operatingly to impart the major portion of the driving torque, the secondary runner mounted for action as a stationary reaction member or as a runner to impose the minor portion of the torque in the direction of the primary runner rotation, clutching elements in arrangement selectively operative to engage said driving elements to impart the driving torque in either direction of rotation.

7. A variable speed transmission comprising, a planetary gearing system of differential action character subject to both driving and reaction forces, a hydraulic torque converter having an impeller rotor coupled to the power input member, a primary runner and a secondary runner coupled to rotatingly coacting elements of the gearing system, an output element of the planetary gearing system responsive to reaction force, a casing member to enclose the impeller rotor and the runners for action on the motive fluid to impart driving torque, said rotatingly coacting elements and said output element of the gearing system in a ratio action arrangement for imposing at least the major portion of the reaction force upon the primary runner, driving elements in arrangement for rotation in opposite directions, said primary runner mounted operatingly to impart the major portion of the driving torque, the secondary runner rotatably mounted responsive to the motive fluid to impart the minor torque portion, unidirectional braking elements operative to restrict said secondary runner rotation to a single direction, clutching elements in arrangement selectively operative to engage said driving elements to impart the driving torque in either direction of rotation.

8. In a transmission, comprising an impeller rotor coupled to a power input member, a primary runner and a secondary runner, a casing member to enclose the impeller rotor and the runners for providing a hydraulic circuit, a planetary gear set of which a sun gear is coupled to turn with the primary runner, one or more pairs of intermeshed pinions, one of each pair meshed with said sun gear, the other meshed with a ring gear, said pinions are rotatably supported by a planet pinion carrier which is coupled to turn with a forward sun gear of a second planetary gear set, said ring gear coupled to turn with the secondary runner and the planet pinion carrier of the second planetary gear set, one or more pairs of intermeshed pinion members, one of each pair meshed with said forward sun gear, the other meshed with a rearward sun gear of the second planetary gear set.

9. In a transmission as set forth in claim 8, including a unidirectional braking device mounted operative for restricting the secondary runner together with the ring gear and the planet pinion carrier of the second planetary gear set to a single direction of rotation as that of the primary runner and for action of said secondary runner as a reaction member.

10. In a transmission as set forth in claim 8, including a braking device selectively engageable for restraining the secondary runner together with the ring gear and planet pinion carrier of the second planetary gear set from rotation in any direction.

11. In a transmission as set forth in claim 8, including an output shaft, a driven element coupled to turn with said rearward sun gear in the rotating direction of the primary runner, another driven element coupled to turn with the forward sun gear in a direction reversely thereto, clutching means to drivingly connect either of said driven elements to the output shaft.

12. In a transmission including, an impeller rotor, a primary runner and a secondary runner, a casing member to enclose the impeller rotor and the runners to provide a hydraulic circuit, a planetary gearing system of which one element is coupled to the primary runner and another element thereof is coupled to the secondary runner, a third element of the gearing system being mounted responsive to the reaction forces, the three said elements in a ratio action arrangement wherein two elements rotating in the same direction impose at least a major portion of the reaction force upon the primary runner, the runners mounted operatingly for rotation in the same direction in a ratio action of the primary runner to impart the major portion of the driving force and the secondary runner the minor portion, additional elements operative with said ratio action arrangement including the said third element in mounted responsiveness to a greater or lesser degree of reaction force loading and arrangement of the elements for exerting respectively corresponding increase or decrease of the differential speed ratio action between said rotatable elements of the transmission.

13. In a transmission including, an impeller rotor, a primary runner and a secondary runner, a casing member to enclose the impeller rotor and the runners to provide a hydraulic circuit to impart driving torque, a planetary gearing system of which one element is coupled to the primary runner and another element thereof is coupled to the secondary runner, said coupled elements of the gearing system and an output element thereof in mounted responsiveness to reaction force loading thereon in an arrangement including two ratio action elements of operative action in the same direction on said output element for imposing at least the greater portion of the reaction force upon the primary runner, said runners formed and in coupled arrangement with said ratio action elements for the primary runner to impart the major portion of the driving torque and the secondary runner the minor torque portion in the same direction as the primary runner rotation, driven elements mounted for rotation in opposite directions, said ratio action elements mounted responsive to a greater or lesser degree of reaction force loading in arrangement with other elements for exerting respectively corresponding increase or decrease of differential speed ratio action between said rotatable elements of the transmission, clutching elements in arrangement selectively operative to engage said driven elements to impart the driving torque in either direction of rotation.

14. In a transmission including an impeller rotor, a primary runner and a secondary runner, a casing member to enclose the impeller rotor and the runners to provide a hydraulic circuit, a pair of coacting planetary gear sets, the first of said gear sets having an element coupled to turn with the primary runner and a second element thereof coupled to turn with the secondary runner, a third element of the first gear set coupled to turn an element of the second gear set in further operative coacting arrangement of elements to reverse the direction of rotating action transmitted therefrom to the output element of this second gear set, said second element of the first gear set also coupled to turn an element of the second gear set with an action force in the same direction as the rotating action transmitted to said output element.

15. In a transmission including an impeller rotor, a primary runner and a secondary runner, a casing member to enclose the impeller rotor and the runners to provide a hydraulic circuit, a pair of coacting planetary gear sets, the first of said gear sets having an element coupled to turn with the primary runner and a second element thereof to turn with the secondary runner together with an element of the second gear set coupled to turn therewith, a third element of the first gear set coupled to turn another element of the second gear set in an operative coacting arrangement of rotating action reversal transmitted by pinions from said third element to an output element meshed therewith, driven elements mounted for rotation in the opposite directions, clutching elements selectively operative to engage said driven elements for imparting drive in either direction of rotation.

16. In a transmission including, an impeller rotor coupled to a power input member, a primary runner and a secondary runner, a casing member to enclose the impeller rotor and the runners to provide a hydraulic circuit, a planetary gearing system having an element coupled to the primary runner, the secondary runner mounted for action as a reaction member and as a runner in coaction with the gearing system, a second element of the gearing system mounted in an arrangement with a unidirectional braking device operative to restrict said element to a single direction of rotation, a third element of the gearing system coupled to turn a gear element thereof in an operative coacting arrangement providing rotating direction reversal therefrom by pinion gears meshing with said gear element and an output gear element, said second element coupled to turn a carrier element supporting said pinion gears to impart from said carrier an action force in a direction of rotation with the output gear element.

17. In a transmission including, an impeller rotor coupled to a power input member, a primary runner and a secondary runner, a casing member to enclose the impeller rotor and the runners to provide a hydraulic circuit, a planetary gearing system having an element coupled to turn with the primary runner directionally in common with the impeller rotor, the secondary runner mounted for action as a reaction member and as a runner in a coacting ratio action arrangement with the planetary gearing system, a second element of said gearing system mounted in association with a unidirectional braking device operative to restrict this element to a single direction of rotation, said second element coupled to turn a carrier element in a direction common with the impeller rotation, a third element of the gearing system coupled to turn a gear element in an arrangement of reversing the rotating direction therefrom by pinion gears supported by said carrier element and drivingly meshed with said gear element and an output gear element thus rotated directionally in common with the impeller rotation, in the gearing system there being driven elements mounted for rotation in both directions, clutching elements in arrangement selectively operative to engage said driven elements for imparting driving action in either direction of rotation.

18. In a transmission including, an impeller rotor coupled to a power input member, a primary runner and a secondary runner, a casing member to enclose the impeller rotor and the runners to provide a hydraulic circuit, a planetary gearing system having an element coupled to turn with the primary runner directionally in common with the impeller rotation, the secondary runner mounted for action as a reaction member and as a runner in a coacting ratio action arrangement with the planetary gearing system, a second element of said gearing system in association with a unidirectional braking device operative to restrict this element to a single direction of rotation, additional braking elements to prevent said second element from rotation in any direction, this second element in further arrangement of being coupled to turn a carrier element in a direction common with the impeller rotation, a third element of the gearing system coupled to turn a gear element in an arrangement of reversing rotating direction therefrom by pinion gears supported by said carrier element and drivingly meshed with said gear element and an output gear element thus rotated directionally in common with the impeller rotation, in the gearing system there being driven elements mounted for rotation in both directions, clutching elements in arrangement selectively operative to engage said driven elements for imparting driving action in either direction of rotation.

References Cited in the file of this patent
UNITED STATES PATENTS

| | | |
|---|---|---|
| 2,325,876 | Pollard | Aug. 3, 1943 |
| 2,671,357 | Foley | Mar. 9, 1954 |
| 2,762,238 | Baker | Sept. 11, 1956 |